US008961829B2

(12) United States Patent
Mamedov et al.

(10) Patent No.: US 8,961,829 B2
(45) Date of Patent: Feb. 24, 2015

(54) CATALYTIC HYROGENATION OF CARBON DIOXIDE INTO SYNGAS MIXTURE

(75) Inventors: Agaddin M. Kh. Mamedov, Stafford, TX (US); Abdulaziz A. M. Al-Jodai, Riyadh (SA); Ijaz C. Ahmed, Riyadh (SA); Mubarak Bashir, Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 1434 days.

(21) Appl. No.: 12/450,818

(22) PCT Filed: Apr. 23, 2008

(86) PCT No.: PCT/EP2008/003258
§ 371 (c)(1),
(2), (4) Date: Mar. 24, 2010

(87) PCT Pub. No.: WO2008/131898
PCT Pub. Date: Nov. 6, 2008

(65) Prior Publication Data
US 2010/0190874 A1     Jul. 29, 2010

(30) Foreign Application Priority Data

Apr. 27, 2007    (EP) .................................. 07008587

(51) Int. Cl.
| C07C 1/02 | (2006.01) |
| C01B 3/40 | (2006.01) |
| C01B 31/00 | (2006.01) |
| B01J 23/656 | (2006.01) |
| B01J 23/00 | (2006.01) |
| B01J 23/34 | (2006.01) |
| C01B 3/16 | (2006.01) |
| C01B 31/18 | (2006.01) |
| B01J 23/889 | (2006.01) |

(52) U.S. Cl.
CPC ............ *B01J 23/6562* (2013.01); *B01J 23/002* (2013.01); *B01J 23/34* (2013.01); *C01B 3/16* (2013.01); *C01B 31/18* (2013.01); *B01J 23/8892* (2013.01); *B01J 2523/00* (2013.01)
USPC .................... 252/373; 423/418.2; 423/648.1; 423/652

(58) Field of Classification Search
USPC ..................... 423/648.1, 652, 481.2; 252/373
See application file for complete search history.

(56) References Cited

U.S. PATENT DOCUMENTS

| 1,719,867 | A | * | 7/1929 | Arsem .................... 423/418.2 |
| 1,913,364 | A | * | 6/1933 | Bader et al. .............. 423/418.2 |
| 3,479,149 | A | | 11/1969 | Frilette |
| 4,177,167 | A | * | 12/1979 | Manara et al. ................. 502/241 |
| 4,513,100 | A | * | 4/1985 | Fattore et al. ................. 502/303 |
| 4,654,458 | A | * | 3/1987 | Jezl et al. ....................... 585/500 |
| 4,758,249 | A | * | 7/1988 | Bernard et al. ............. 48/197 R |
| 5,068,057 | A | * | 11/1991 | Gustafson et al. ............ 252/373 |
| 5,346,679 | A | | 9/1994 | Osaki et al. |
| 5,496,530 | A | | 3/1996 | Vannby et al. |
| 6,328,945 | B1 | | 12/2001 | Hufton et al. |
| 7,022,306 | B1 | * | 4/2006 | Oroskar et al. ............ 423/648.1 |
| 7,361,199 | B2 | | 4/2008 | Gittleman et al. |
| 2002/0037938 | A1 | * | 3/2002 | Luo et al. ...................... 518/716 |
| 2003/0113244 | A1 | | 6/2003 | Dupont et al. |
| 2004/0180000 | A1 | * | 9/2004 | Hagemeyer et al. .......... 423/656 |
| 2006/0216227 | A1 | * | 9/2006 | Idem et al. ..................... 423/651 |

FOREIGN PATENT DOCUMENTS

| EP | 1149799 A1 | 10/2001 |
| EP | 1153660 A2 | 11/2001 |
| EP | 1 445 235 A2 | 8/2004 |
| GB | 2 168 718 A | 6/1986 |
| GB | 2 279 583 A | 1/1995 |
| JP | 2000169411 A | 6/2000 |
| WO | WO 96/06064 | 2/1996 |
| WO | WO 2005/026093 A1 | 3/2005 |
| WO | WO 2005026093 A1 * | 3/2005 |

OTHER PUBLICATIONS

Min-Dar Lee, et al. Effects of Addition of Chromium, Manganese or Molybdenum to Iron Catalysts for Carbon Dioxide Hydrogenation; Applied Cat. 72 (1991) 267-281.
Dorner et al.; "K and Mn Doped CO2 Hydrogenation Catalysts: Detection of KAlH4 as Part of the Catalyst's Active Phase"; Applied Catalysis A: General; vol. 373; 2010; pp. 112-121.
Extended European Search Report; European Application No. 07008587.3; Date of Mailing: Oct. 2, 2007; 5 Pages.
Hydrogenation; Wikipedia, The Free Encyclopedia; http://en.wikipedia.org/wiki/Hydrogenation; Accessed: Aug. 29, 2011; 11 Pages.
International Search Report; International Application No. PCT/EP2008/003258; International Filing Date: Apr. 23, 2008; Date of Mailing: Aug. 6, 2008; 6 Pages.
Written Opinion of the International Searching Authority; International Application No. PCT/EP2008/003258; International Filing Date: Apr. 23, 2008; Date of Mailing: Aug. 6, 2008; 5 Pages.

(Continued)

*Primary Examiner* — Stanley Silverman
*Assistant Examiner* — Syed Iqbal
(74) *Attorney, Agent, or Firm* — Cantor Colburn LLP

(57) ABSTRACT

The invention relates to a process of making a syngas mixture containing hydrogen, carbon monoxide and carbon dioxide, comprising a step of contacting a gaseous feed mixture containing carbon dioxide and hydrogen with a catalyst, which catalyst substantially consists of Mn oxide and an oxide of at least one member selected from the group consisting of Cr, Ni, La, Ce, W, and Pt. This process enables hydrogenation of carbon dioxide into carbon monoxide with high selectivity, and good catalyst stability over time and under variations in processing conditions. The process can be applied separately, but can also be integrated with other processes, both upstream and/or down-stream; like methane reforming or other synthesis processes for making products like alkanes, aldehydes, or alcohols.

15 Claims, No Drawings

(56) References Cited

OTHER PUBLICATIONS

Japanese Patent No. 2000169411 (A); Publication Date: Jun. 20, 2000; Abstract Only; 2 Pages.

Bourzutschky et al.; "Hydrogenation of CO2 and CO2/CO Mixtures Over Copper-Containing Catalysts"; Journal of Catalysis; vol. 124; 1990; pp. 73-85.

JP S63-005034; English Abstract; Date of Publication Nov. 1, 1988; 1 page.

Ando et al.; "Methanation of Carbon Dioxide Over LiNi4X Type Catalysts"; Energy Convers. Mgmt.; vol. 36, Nos. 6-9; 1995; pp. 653-656.

Kanai et al.; "Role of ZnO in Promoting Methanol Synthesis Over a Physically-Mixed Cu/SiO2 and ZnO/SiO2 Catalyst"; Energy Convers. Mgmt.; vol. 36, Nos. 6-9; 1995; pp. 649-652.

Mamedov; "Heterogeneous—Oxidative Catalysis by CO2—Properties and Reactivity of the Oxygen, Generated from Carbon Dioxide"; Symposium on Heterogeneous Hydrocarbon Oxidation Presented Before the Division of Petroleum Chemistry, Inc.; 211th National Meeting, American Chemical Society; New Orleans, LA; Mar. 24-29, 1996.

Sugawa et al.; "Methanol Synthesis from CO2 and H2 Over Silver Catalyst"; Energy Convers. Mgmt.; vol. 36, Nos. 6-9; 1995; pp. 665-668.

\* cited by examiner

CATALYTIC HYROGENATION OF CARBON DIOXIDE INTO SYNGAS MIXTURE

The invention relates to a catalytic process for producing a syngas mixture from carbon dioxide, more specifically to a process of making a syngas mixture containing hydrogen, carbon monoxide and carbon dioxide, comprising a step of contacting a gaseous feed mixture containing carbon dioxide and hydrogen with a metal oxide catalyst.

Such a process is known from patent application US 2003/0113244 A1. This publication discloses a process for the production of a syngas (generally used abbreviation for synthesis gas) mixture that is rich in carbon monoxide, by conversion in the gas phase of $CO_2$ and $H_2$ in the presence of a catalyst based on zinc oxide and chromium oxide, and not containing iron. The simultaneous presence of Zn and Cr is indicated to be essential for a good reaction rate, whereas presence of Fe (and Ni) should be avoided to suppress forming of methane via so-called methanation side-reactions. Formation of methane as a by-product is generally not desired, because it not only means less CO is being produced, but also because it may reduce catalyst life-time by accompanied formation of coke and deposition thereof.

In the past decades, numerous processes have been developed to produce synthesis gas, which is one of the most important feedstocks in the chemical industry. Syngas is a gaseous mixture containing hydrogen ($H_2$) and carbon monoxide (CO), which may further contain other gas components like carbon dioxide ($CO_2$), water ($H_2O$), methane ($CH_4$), and/or nitrogen ($N_2$). Natural gas and (light) hydrocarbons are the predominant starting material for making synthesis gas. Syngas is successfully used as synthetic fuel and also in a number of chemical processes, such as synthesis of methanol or ammonia, Fischer-Tropsch type and other olefin synthesis, hydroformulation or carbonylation reactions, reduction of iron oxides in steel production, etc.

Such syngas processes frequently use methane as a main feed gas component, which can be converted to syngas by steam reforming, partial oxidation, $CO_2$ reforming, or by a so-called auto-thermal reforming reaction. One of the disadvantages associated with syngas production by steam reforming of methane, which is the most widely applied process to produce syngas, is that the composition of the produced gas mixture is limited by the reaction stoichiometry to $H_2/CO$ ratios of 3 or higher. In order to avoid such drawback, and initiated as well by the strong influence that an increasing amount of $CO_2$ in the atmosphere has on the environment, research has been conducted to manufacture syngas from carbon dioxide as a raw material; based on the known equilibrium reaction (generally referred to as the water gas shift (WGS) or more specifically in the present case the reverse water gas shift (RWGS) reaction):

$$CO_2 + H_2 \leftrightarrows CO + H_2O$$

In e.g. GB 2168718 A it was proposed to combine the RWGS reaction with steam reforming of methane. Such combination of reactions allows to adjust the molar ratio of hydrogen to carbon monoxide ($H_2/CO$), or better the stoichiometric number $SN = ([H_2]-[CO_2])/([CO]+[CO_2])$ in the final syngas mixture to other values than about 3, depending on the intended subsequent use of the syngas.

Conversion of $CO_2$ to CO by a catalytic RWGS reaction has been recognized as a promising process for $CO_2$ utilization, and has been subject of various studies in the past decades. Early work proposed iron oxide/chromium oxide (chromite) as a suitable catalyst for this endothermic reaction; see e.g. U.S. Pat. No. 1,913,364. Disadvantages of this catalyst include methane formation.

GB 2279583 A directs to a catalyst for the reduction of carbon dioxide, which comprises at least one transition metal selected from Groups VIII and VIa supported on ZnO alone, or on a composite support material containing ZnO. In order to suppress methane formation and catalyst degradation, stoichiometric hydrogen/carbon dioxide mixtures and low reaction temperatures are used, but resulting in relatively low carbon dioxide conversion.

U.S. Pat. No. 5,346,679 relates to the reduction of carbon dioxide into carbon monoxide with hydrogen using a catalyst based on tungsten sulphide.

U.S. Pat. No. 3,479,149 discloses that crystalline alumino-silicates can be used as catalyst in the conversion of carbon monoxide and water to carbon dioxide and hydrogen, and vice versa.

U.S. Pat. No. 5,496,530 relates to carbon dioxide hydrogenation to syngas in the presence of a nickel, iron oxide, copper or zinc containing catalyst.

In WO 96/06064 A1 a process for methanol production is described, which comprises a step of converting part of the carbon dioxide contained in a feed mixture with hydrogen to carbon monoxide, in the presence of a catalyst that can be used for the WGS reaction; exemplified by Zn—Cr/alumina and $MoO_3$/alumina.

WO 2005/026093 A1 discloses a process for producing DME, which comprises a step of reacting carbon dioxide with hydrogen in a RWGS reactor to provide carbon monoxide, in the presence of a supported catalyst selected from ZnO; $MnO_x$ (x=1~2); an alkaline earth metal oxide and NiO.

EP 1445232 A2 discloses a (reverse) water gas shift reaction for production of carbon monoxide by hydrogenation of carbon dioxide at high temperatures, in the presence of a Mn—Zr oxide catalyst.

A drawback of the known process as disclosed in US 2003/0113244 A1 is the selectivity of the catalyst employed; that is methane formation from carbon dioxide is still observed as a side-reaction. In the illustrative example this is quantified as 0.8 vol % of methane being formed in the gas output of the reactor, at a degree of conversion of carbon dioxide of 40%.

The object of the present invention is therefore to provide a catalyst that shows improved selectivity in reducing carbon dioxide with hydrogen into a syngas mixture, with only very little methane formation, and with good catalyst stability.

This object is achieved according to the invention by contacting a gaseous feed mixture containing carbon dioxide and hydrogen with a catalyst that substantially consists of Mn oxide, and an oxide of at least one member selected from the group consisting of Cr, Ni, La, Ce, W, and Pt.

With the process according to the present invention, carbon dioxide can be hydrogenated into carbon monoxide with high selectivity, the catalyst showing good stability over time and under variations in processing conditions. Especially forming of methane, via a so-called methanation reaction is suppressed; typically, only trace amounts of methane are found in the syngas mixture formed by the process according to the invention.

Methanation reactions are the reactions that produce methane and water from a carbon source, such as carbon dioxide and carbon monoxide, and hydrogen:

$$CO + 3H_2 \rightarrow CH_4 + H_2O$$

$$CO_2 + 4H_2 \rightarrow CH_4 + 2H_2O$$

In the process according to the present invention a product mixture is obtained having an amount of methane of typically less than 0.5 vol %, preferably the amount of methane is less than 0.1 vol %, or even below the detection limit of the CG equipment used for on-line analysis of the product stream. The process according to the invention thus shows very high selectivity towards syngas, more specifically to forming CO; CO selectivity is typically higher than 95%, preferably higher than 98%, and most preferably higher than 99% or even 99.5%.

The process of the invention shows good catalyst stability, also at temperatures of above about 600° C.; meaning that the composition of the product mixture varies little over time. A further advantage is that the reaction can be performed over a wide pressure range, from atmospheric conditions up to e.g. 6 MPa. It is a further advantage, that the process can also be operated with air or oxygen being present in the feed stream; or that in case the amount of CO formed would tend to decrease somewhat, co-feeding of some air during a short period will result in catalyst re-activation, and thus in increased CO formation, even similar to the initial level.

A further advantage of the process according to the invention is that the stoichiometric number (SN) of the syngas mixture obtained can be varied over a wide range, e.g. by varying the composition of the feed mixture. SN can, for example, vary from 0.5 to 3.0; making it possible to apply the syngas mixture obtained as a raw material in the synthesis of various other products; like alkanes, such as ethane, propane and iso-butane; aldehydes; ethers like dimethylether; or alcohols such as methanol. A further advantage is that the syngas made with the process of the invention can be applied without the need to separate excess $H_2$. Still a further advantage is that the process can be applied separately, but can also be integrated with other processes, both up-stream and/or downstream; like steam reforming or dry reforming of methane, or up-stream with other synthesis processes for a.o. above-mentioned products.

Within the context of the present application, a catalyst that substantially consists of Mn oxide and other specific elements is understood to mean that the specified metals (in the form of their oxides) form the active sites of the catalyst composition. The catalyst may further comprise other components, like a support, a binder material, or other components including usual impurities, as known to the skilled person.

In the process according to the invention, the catalyst substantially consists of Mn oxide, and an oxide of at least one member selected from the group consisting of Cr, Ni, La, Ce, W, and Pt. Without wishing to be bound to any theory, the inventors believe that suited elements defining the above group are redox metal elements having certain basic properties. It was found that elements of more acidic nature promote undesirable side-reactions, especially methane formation. In addition, presence of these other metals results in better dispersion of the metal components and reduces the risk of agglomeration of active sites. Preferably, the catalyst is based on oxides of Mn and Ce and/or La, more preferably the catalyst is based on Mn and La, as these catalysts show very high $CO_2$ conversion. La can be present as oxide but also as carbonate or oxycarbonate, such compounds can also function as support for the catalyst. Presence of Pt in the catalyst composition is thought to enhance the reaction via activation of hydrogen. Pt may, however, also induce methane formation, its content is thus preferably kept relatively low.

Suitable forms of manganese oxide present in the catalyst include $MnO_2$, $Mn_2O_3$, $Mn_3O_4$, and mixtures thereof. The Mn-content of the catalyst may vary within broad ranges. A certain minimum content is needed to reach a desired level of catalyst activity, but a high content will increase the chance of particle (active site) agglomeration, and reduce efficiency of the catalyst. A suitable range is from 1 to 50 mass % (elemental Mn based on total mass of catalyst composition). Preferably, Mn content is from 5 to 30 mass %, a more preferred range is from 10 to 20 mass %.

The amount of each metal component present in the catalyst used in the process according to the present invention may vary within broad limits; a suitable range is from 0.1 to 50 mass % (metal content based on total mass of catalyst composition). Preferably, said metal content is from 0.2 to 30 mass %, more preferably the range is from 0.3 to 20 mass %.

Preferably, the catalyst used in the process according to the invention further comprises at least one alkali or alkaline earth metal, because this further suppresses coke formation, and thus improves catalyst stability/life-time. More preferably, said metal is selected from the group consisting of Li, K, Cs and Sr. The advantage of such catalysts is that side-reactions in the process of the invention are effectively suppressed, especially the methanation reaction. If the catalyst comprises a support material, an additional advantage of these metals being present is that the catalyst is more robust, i.e. has better mechanical stability.

The amount of each alkali or alkaline earth metal component present in the catalyst used in the process according to the present invention may vary within broad ranges; a suitable range is from 0.1 to 50 mass % (metal content based on total mass of catalyst composition). Preferably, said metal content is from 0.2 to 30 mass %, more preferably the range is from 0.3 to 20 mass %.

The catalyst used in the process according to the invention may further comprise an inert carrier or support material, of certain particle size and geometry. Suitable supports include those materials having good stability at the reaction conditions to be applied in the process of the invention, and are known by a person skilled in the art of catalysis. Preferably, the support material is at least one member selected from the group consisting of alumina, magnesia, silica, titania, zirconia and mixtures thereof. $Al_2O_3$ and MgO are found to be very suited as support in the present process. In a special embodiment lanthanium oxide or (oxy)carbonate, e.g. $La_2O_3$ is used as support, but also contributes to catalyst activity.

The amount of support material present in the catalyst used in the process according to the present invention may vary within broad ranges; a suitable range is from 40 to 95 mass % (based on total mass of catalyst composition). Preferably, the support forms from 50 to 90 mass %, more preferably from 60 to 85 mass % of total catalyst composition. In case of La-oxides, La content may vary from 0.1 to 95 mass %.

The catalyst that is used in the process of the invention may be prepared by any conventional catalyst synthesis method as known in the art. Generally such process includes the steps of making aqueous solutions of the desired metal components, for example from their nitrate or other soluble salt; mixing the solutions optionally with a support material; forming a solid catalyst precursor by precipitation (or impregnation) followed by removing water and drying; and then calcining the precursor composition by a thermal treatment in the presence of oxygen.

The catalyst may be applied in the process of the invention in various geometric forms, for example as spherical pellets.

In the process according to the invention the step of contacting the gaseous feed mixture containing carbon dioxide and hydrogen with a catalyst can be performed over a wide temperature range. As the reaction is endothermic, a high temperature will promote conversion, but too high temperature may also induce unwanted reactions; therefore this step is preferably performed at a temperature ranging from 300 to 900° C., more preferably from 400 to 800° C., even more preferred from 500 to 750° C.

The step of contacting the gaseous feed mixture containing carbon dioxide and hydrogen with a catalyst according to the process of the invention can be performed over a wide pressure range. A higher pressure tends to enable lower reaction temperatures, but very high pressures are not practical; therefore this step is preferably performed at a pressure ranging from 0.1 to 6 MPa, more preferably from 1.5 to 5 MPa, or from 2 to 4 MPa.

The contact time in the step of contacting the gaseous feed mixture containing carbon dioxide and hydrogen with a catalyst according to the process of the invention may vary widely, but is preferable from 0.5 to 6 s, more preferably from 1.5 to 5 s, or from 2 to 4 s.

The process according to the invention can be performed on conventional reactors and apparatuses; which are for example also used in methane reforming reactions. The skilled man will be able to select a suitable reactor set-up depending on specific conditions and circumstances. Suitable types of reactors include continuous fixed bed reactors. In view of the high reaction temperature, and catalytic activity of some metals like Ni in methanation reactions, use of a material comprising Ni or other active metals for making reactors walls etc. is preferable avoided. For this reason it is preferred to apply e.g. glass linings for relevant reactor parts.

In the process according to the present invention, carbon dioxide is selectively converted into carbon monoxide by a reverse water gas shift reaction in the presence of a specific catalyst. The resulting product of this $CO_2$ hydrogenation process is a gas mixture containing carbon monoxide and water, and non-converted carbon dioxide and hydrogen. This can, in case of excess hydrogen, also be represented by the following equation:

$$CO_2 + nH_2 \leftrightarrows CO + (n-1)H_2 + H_2O$$

The water formed in this reaction is generally removed from the product stream, because this will drive the equilibrium reaction in the desired direction, and because water is often interfering with subsequent reactions of the syngas. Water can be removed from the product stream with any suitable method known in the art, e.g. by condensation and liquid/gas separation.

The amount of hydrogen in the feed gas, that is the value for n in the above reaction scheme, may vary widely, for example from n=1 to n=5, to result in a syngas composition, e.g. expressed as its $H_2/CO$ ratio or as the stoichiometric number (SN), which can consequently vary within wide limits. The advantage thereof is that the syngas composition can be adjusted and controlled to match the desired use requirements.

Preferably, SN of the produced syngas mixture is from 0.1 to 3.0; more preferably SN is from 0.5 to 2.8 or even from 0.9 to 2.7. Such syngas product streams can be further employed as feed stock in different syngas conversion processes, like methanol formation, olefin synthesis, reduction of iron oxide in steel production, oxosynthesis, or (hydro)carbonylation reactions.

In a preferred embodiment the feed gas contains equimolar amounts of $CO_2$ and $H_2$ (n=1 in above equation), resulting in a syngas composition that (at complete conversion and water removal) mainly consists of CO; which syngas is very suited for use in carbonylation reactions, for example carbonylation of methanol into acetic acid.

In another preferred embodiment, the feed gas contains $CO_2$ and $H_2$ in molar ratio of 1:2 (n=2 in above equation), resulting in a syngas composition with $H_2/CO$ or SN of about 1; which can be advantageously used for producing oxygenates.

In a further preferred embodiment the feed gas contains $CO_2$ and $H_2$ in molar ratio of 1:3 (n=3 in above equation), resulting in a syngas composition with $H_2/CO$ or SN of about 2; which can be advantageously used in olefin or methanol synthesis processes.

The carbon dioxide in the gaseous feed mixture used in the process of the invention can originate from various sources. Preferably, the carbon dioxide comes from a waste gas stream, e.g. from a plant on the same site, like for example from ammonia synthesis, optionally with (non-catalytical) adjustment of the gas composition, or after recovering the carbon dioxide from a gas stream. Recycling such carbon dioxide as starting material in the process of the invention thus contributes to reducing the amount of carbon dioxide emitted to the atmosphere (from a chemical production site). The carbon dioxide used as feed may also at least partly have been removed from the effluent gas of the RWGS reaction itself.

The gaseous feed mixture comprising carbon dioxide and hydrogen used in the process of the invention may further contain other gases, provided that these do not negatively affect the reaction. Examples of such other gases include steam or an alkane, like methane, propane or iso-butane; preferably the gaseous feed mixture further comprises methane. An advantage of such a process according to the invention is that the carbon dioxide hydrogenation reaction can be combined and even integrated with for example steam reforming of methane or with dry reforming of methane (also called $CO_2$ reforming). An additional advantage hereof is that water formed by $CO_2$ hydrogenation can react with methane to produce more hydrogen; even such that the water level in the final product is very low.

The invention thus also relates to an integrated process for making syngas comprising a hydrocarbon, esp. methane, reforming step and a RWGS step as defined in the above. By simultaneously operating these syngas producing reaction steps, the syngas composition can be better controlled, for example a syngas with SN of about 2 can be obtained, with high hydrogen selectivity. Simultaneous conversion of carbon dioxide with hydrogen and methane can be represented by the following reaction scheme:

$$CO_2 + 2H_2 + CH_4 \rightarrow 2CO + 4H_2$$

Preferably, the hydrogen to carbon dioxide ratio in the feed mixture is at least 2 in this combined process according to the invention, because such excess hydrogen in the gas streams prevents coke formation, which could otherwise de-activate the catalyst; and thus this process results in good catalyst stability.

In GB 2168718 A and U.S. Pat. No. 6,328,945 B1 also processes that combine methane reforming and RWGS steps are disclosed, but these publications do not describe or suggest the use of a catalyst as defined in the present invention.

The invention further relates to the use of the syngas mixture obtained with the process according to the invention as feed material for a process of making a chemical product; like methanol production, olefin synthesis (e.g. via Fischer-Tropsch reaction), aromatics production, oxosynthesis, carbonylation of methanol, carbonylation of olefins, or the reduction of iron oxide in steel production.

The invention therefore further relates to a process for making a chemical product using a syngas mixture as an intermediate or as feed material, which process comprises a step wherein carbon dioxide is hydrogenated according to the invention. Examples of such a process include methanol production, olefin synthesis, aromatics production, oxosynthesis, carbonylation of methanol, carbonylation of olefins, or reduction of iron oxide in steel production.

In a preferred embodiment, the invention concerns a process of making oxo alcohols via hydroformylation of olefins with syngas, comprising the steps of methane reforming and carbon dioxide hydrogenation according to the invention, to result in a syngas mixture of suitable stoichiometry. By integrating methane (steam) reforming and RWGS steps the excess hydrogen available in the reformate is advantageously utilized to optimize the amount of carbon monoxide formed. The amount of CO formed in the RWGS step can also be controlled by the reaction temperature. Preferably, the syngas made has a composition characterized by a SN of about 1.

In another preferred embodiment, the invention concerns a process of making methanol from methane via synthesis gas, comprising a step wherein carbon dioxide is hydrogenated according to the invention, to result in a syngas mixture of suitable stoichiometry; i.e. preferably having SN of about 2. For the step of making methanol from syngas in this process, any suitable synthesis process as known in the art can be applied. Preferably, in this process purge gas from the methanol synthesis reaction, containing hydrogen and carbon dioxide is recycled back to the carbon dioxide hydrogenation step. A further advantage of this process according to the invention is that the heat produced in the exothermic methanol synthesis step can be utilized in the endothermic RWGS step.

The invention will now be further elucidated with the following experiments.

EXAMPLE 1

A mixed oxide catalyst composition 1% Li-10% Cr-8% Mn—O/$Al_2O_3$ was made by impregnating alumina support with aqueous solutions of nitrate salts of the indicated metals, precipitating the metals on the support and isolating the solids, followed by drying at about 120° C. and calcining at about 500° C. during about 4 hours. The metal content of the catalyst composition was determined by x-ray diffraction and elemental analysis methods, and indicated as mass % based on total composition in the representation 1% Li-10% Cr-8% Mn—O/$Al_2O_3$.

A glass tube was filled with about 1 ml of catalyst to make a fixed bed type of reactor, and placed vertically inside a temperature controlled oven. A gaseous feed mixture was made by mixing carbon dioxide and hydrogen, and was passed through the reactor tube with an inlet flow rate of 52 ml/min (controlled with a mass flow controller). The composition of the resulting syngas mixture (product) was measured on-line with gas chromatography, after removing water from the mixture in a cold trap. Reaction was performed at atmospheric pressure, other conditions and results for some experiments are presented in Table 1 (composition measured after about one hour reaction, unless indicated otherwise)

In the syngas mixture the amount of methane was too low to be reliably quantified (meaning the concentration was below 0.1 vol %; and CO selectivity over 99.5%.

TABLE 1

| Experiment | | Gas composition (vol %) | | | |
|---|---|---|---|---|---|
| | | $CO_2$ | $H_2$ | CO | SN |
| Exp. 1.1 | Feed | 52.0 | 48.0 | | |
| | Product at 680° C. | 40.5 | 40.2 | 20.5 | 0.32 |
| Exp. 1.2 | Feed | 33.8 | 66.2 | | |
| | Product at 680° C. | 21.7 | 59.7 | 18.5 | 0.95 |
| | Product at 700° C. | 22.5 | 58.5 | 18.9 | 0.85 |
| | Product at 700° C.; after 5 days | 23.5 | 60.0 | 16.3 | 0.92 |

EXAMPLE 2

Experiments were performed analogously to Example 1, but with a feed gas containing less carbon dioxide; and catalyst performance with time, and effects of adding air (oxygen) were tested. Results collected in Table 2 indicate that passing air through the reactor can re-activate the catalyst to recover carbon dioxide conversion, but with little effect on selectivity and SN.

EXAMPLE 3

In this case 8% Mn—O/$La_2O_3$ was used as catalyst and gas feed rate was 52.5 ml/min; otherwise experiments were performed analogously to Example 2. Results are presented in Table 3.

TABLE 2

| Experiment | | Gas composition (vol %) | | | |
|---|---|---|---|---|---|
| | | $CO_2$ | $H_2$ | CO | SN |
| Exp. 2.1 | Feed | 23.4 | 76.6 | | |
| | Product at 680° C.; after 15 days | 14.2 | 75.3 | 10.3 | 2.5 |
| Exp. 2.2 | 20 min air feed; product at 700° C. | 10.5 | 74.0 | 15.4 | 2.5 |
| | Product at 700° C.; after two days (total 17 days) | 12.5 | 75.2 | 12.3 | 2.5 |
| | 20 min air feed; product at 700° C. | 10.8 | 72.9 | 16.2 | 2.3 |
| Exp. 2.3 | Feed diluted with 10 vol % air | 21.1 | 68.9 | | |
| | Product at 700° C. | 16.4 | 65.8 | 8.4 | 2.0 |
| Exp. 2.4 | Feed | 23.4 | 76.6 | | |
| | Product at 700° C. | 14.6 | 73.5 | 11.3 | 2.3 |
| | Product at 700° C.; after another day (total 18 days) | 11.8 | 75.5 | 12.6 | 2.6 |
| | 10 min air feed; product at 700° C. | 10.9 | 74.0 | 15.6 | 2.4 |
| | Product at 700° C.; after 19 days | 12.0 | 73.9 | 14.1 | 2.4 |

TABLE 3

| Experiment | | Gas composition (vol %) | | | |
|---|---|---|---|---|---|
| | | $CO_2$ | $H_2$ | CO | SN |
| Exp. 3.1 | Feed | 23.0 | 77.0 | | |
| | Product at 580° C. | 12.8 | 74.5 | 12.7 | 2.4 |
| | Product at 580° C.; after 4 hours | 12.9 | 73.8 | 13.2 | 2.3 |
| Exp. 3.2 | Feed diluted with 10 vol % air | 20.7 | 69.3 | | |
| | Product at 580° C. | 15.1 | 64.4 | 10.8 | 1.9 |
| Exp. 3.3 | Feed back to | 23.0 | 77.0 | | |
| | Product at 580° C. | 12.9 | 74.0 | 12.9 | 2.4 |

EXAMPLE 4

In these experiments a glass tube filled with 3 ml of the catalyst composition 0.3% Pt-20% Ce-4% Mn—O/MgO was applied; otherwise experiments were performed analogously to Example 3. Results are presented in Table 4.

TABLE 4

| Experiment | | Gas composition (vol %) | | |
| --- | --- | --- | --- | --- |
| | | CO$_2$ | H$_2$ | CO |
| Exp. 4.1 | Feed | 23.5 | 76.5 | |
| | Product at 530° C. | 13.4 | 74.1 | 12.5 |
| Exp. 4.2 | 20 min air feed; product at 530° C. | 13.6 | 74.0 | 12.4 |

EXAMPLE 5

In these experiments a catalyst was prepared by mixing two suspensions of 2% W—MnO$_2$ and 2% Sr—O/La$_2$O$_3$ in a 50/50 ratio, followed by drying at 120° C. and calcining at 700° C. A glass tube reactor was filled with 1 ml of this 50/50 2% W—MnO$_2$/2% Sr—O/La$_2$O$_3$ catalyst, and experiments were performed analogously to Example 1. Results are presented in Table 5.

TABLE 5

| Experiment | | Gas composition (vol %) | | |
| --- | --- | --- | --- | --- |
| | | CO$_2$ | H$_2$ | CO |
| Exp. 5.1 | Feed | 23.5 | 76.5 | |
| | Product at 580° C. | 14.2 | 75.4 | 10.4 |

The invention claimed is:

1. A process of making a syngas mixture containing hydrogen, carbon monoxide, and carbon dioxide, comprising contacting a gaseous feed mixture containing carbon dioxide and hydrogen with a catalyst consisting essentially of oxides of Mn and La and optionally an oxide of at least one member selected from the group consisting of Cr, Ni, Ce, W, and Pt, to form the carbon monoxide.

2. The process according to claim 1, wherein the catalyst substantially consists of oxides of Mn and La.

3. The process according to claim 1, wherein the catalyst further comprises at least one member selected from the group consisting of Cr, Ni, Ce, W, and Pt.

4. The process according to claim 1, wherein the catalyst further comprises at least one alkali metal or alkaline earth metal.

5. The process according to claim 4, wherein said metal is selected from the group consisting of Li, K, Cs and Sr.

6. The process according to claim 1, wherein the catalyst further contains a support.

7. The process according to claim 6, wherein said support is selected from the group consisting of Al$_2$O$_3$, MgO, SiO$_2$, TiO$_2$ and ZrO$_2$.

8. The process according to claim 1, wherein the contacting step is carried out at a temperature of from 300 to 900° C., at a pressure of from 0.1 to 6 MPa, and with a contact time of from 0.5 to 6 s.

9. The process according to claim 1, wherein the feed mixture contains hydrogen and carbon dioxide in a ratio of from 1 to 5.

10. The process according to claim 1, wherein the syngas has a stoichiometric number of from 0.1 to 3.0.

11. The process according to claim 1, wherein the feed mixture further comprises an alkane.

12. The process according to claim 11, wherein said alkane is methane.

13. A process for making syngas comprising:
reforming methane and hydrogenating carbon dioxide by contacting a gaseous feed mixture containing carbon dioxide and hydrogen with a catalyst consisting essentially of oxides of Mn and La, and optionally, an oxide of at least one member selected from the group consisting of Cr, Ni, Ce, W, and Pt, to form the syngas.

14. A process for making a chemical product using a syngas mixture as an intermediate or as feed material, comprising:
contacting a gaseous feed mixture containing carbon dioxide and hydrogen with a catalyst consisting essentially of:
a) oxides of Mn and La; or
b) oxides of Mn and La, and an oxide of at least one member selected from the group consisting of Cr, Ni, Ce, W, and Pt;
to form the syngas mixture comprising carbon monoxide; and
reacting the syngas mixture with a reactant to form the chemical product.

15. A process of methanol production, olefin synthesis, aromatics production, hydroformylation of olefins, carbonylation of methanol, or carbonylation of olefins using a syngas mixture as an intermediate or as feed material, comprising:
contacting a gaseous feed mixture containing carbon dioxide and hydrogen with a catalyst consisting essentially of:
a) oxides of Mn and La; or
b) oxides of Mn and La, and an oxide of at least one member selected from the group consisting of Cr, Ni, Ce, W, and Pt;
to form the syngas mixture comprising carbon monoxide; and
reacting the syngas mixture with a reactant to form at least one of methanol, an olefin, an aromatic, a hydroformed olefin, a carbonylated methanol, and a carbonylated olefin.

* * * * *